Figure 1:
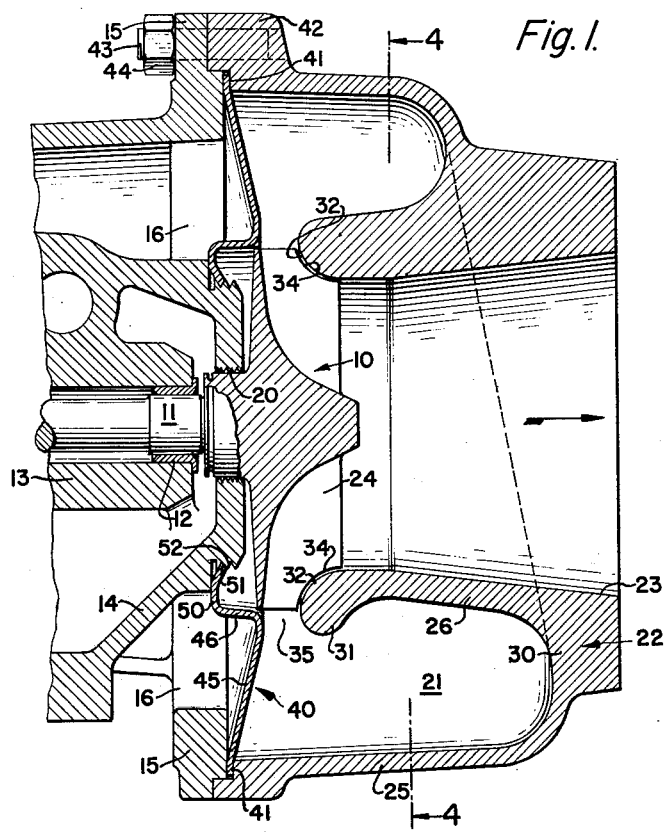

April 25, 1961 H. EGLI 2,981,516
TURBINE HOUSING
Filed July 3, 1958 2 Sheets-Sheet 1

INVENTOR:
HANS EGLI,
BY
Attorney.

April 25, 1961 H. EGLI 2,981,516
TURBINE HOUSING
Filed July 3, 1958 2 Sheets-Sheet 2

INVENTOR:
HANS EGLI,
BY J. Thomas Eubanks
Attorney.

United States Patent Office 2,981,516
Patented Apr. 25, 1961

2,981,516

TURBINE HOUSING

Hans Egli, Santa Monica, Calif., assignor to The Garrett Corporation, Los Angeles, Calif., a corporation of California Filed July 3, 1958, Ser. No. 746,374

3 Claims. (Cl. 253—55)

This invention pertains to turbines and more particularly to a housing for a turbine incorporating a vaneless type nozzle construction which permits the volume of the housing to be easily changed to accommodate a wide range of turbine wheels.

Vaneless type turbine housings have several advantages, such as, a low cost of construction and ability to allow foreign matter to pass through the nozzle openings to the turbine wheel. These advantages are particularly important in turbocompressors which are used to supercharge industrial engines where the likelihood of foreign matter passing through the turbine is much greater than in other applications. While vaneless nozzles have the above advantages, they do have one serious disadvantage, that is in order to change the capacity of the turbine a completely new housing must be fabricated. This means that numerous castings must be maintained in order to supply a full range of turbine sizes to meet various demands.

This invention would solve the above difficulties of vaneless nozzle turbines by providing a turbine housing which acts as a vortex generator causing the fluid supplied to the turbine to approach the turbine wheel in a vortex flow path. A scroll recess in the turbine housing acts as vortex generator and has a substantially constant radial dimension, while its axial dimension decreases from a maximum to substantially zero as the fluid travels from the inlet around the periphery of the turbine wheel. In order to vary the capacity of the turbine, the vortex generating chamber or recess is provided with one radial wall which is removable. By forming this radial wall from sheet metal, the cross-sectional area of the recess may be easily changed without changing its characteristics.

Accordingly, it is the principal object of this invention to provide a housing for a vaneless nozzle turbine which has provisions for varying the admission capacity of the turbine by changing one end wall of the housing.

A further object of this invention is to provide a housing for a vaneless nozzle turbine which acts as a vortex generator chamber causing the gases to approach the turbine wheel at a different angle with respect to the periphery of the turbine wheel as the turbine operating conditions vary between no-load and full-load.

A still further object of the present invention is the provision of an economical manner in meeting the demand for scroll housings of varying areas.

Another object is to provide a variable flow angle in a turbine between full load and no-load conditions.

Figure 2:
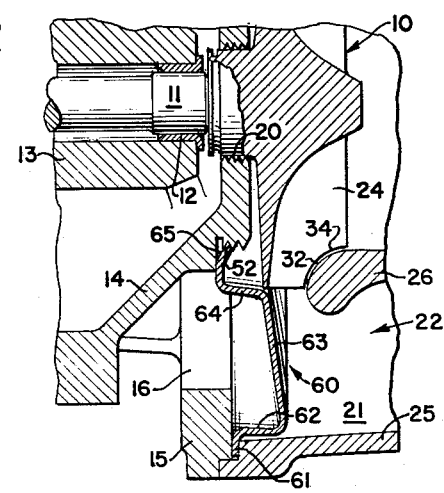
Figure 3:
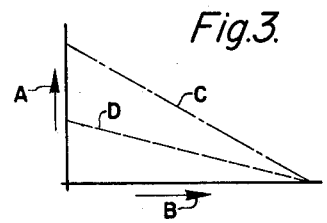

These and other objects and advantages of this invention will be more easily understood from the following detailed description of a preferred embodiment when taken in conjunction with the attached drawing, in which:

Fig. 1 is a cross-section of a turbine housing incorporating this invention;

Fig. 2 is a partial section of the same turbine housing showing the use of a different end wall for reducing the turbine capacity; and Fig. 3 is a graph showing typical relationships between the cross-sectional area of the scroll chamber as produced by a plane encircling about the axis of the turbine wheel and intersecting the chamber wherein the ordinate "A" represents the cross-sectional area of the scroll and the absicissa "B" represents the circumferential location of the intersecting plane about the turbine wheel.

Figure 4:
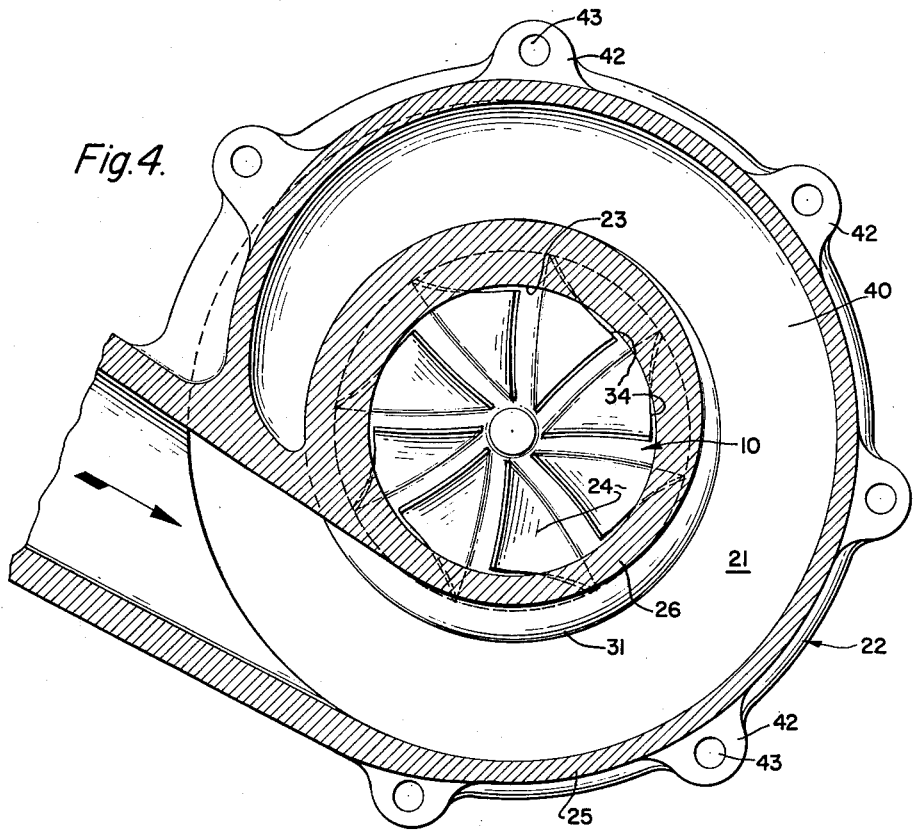

Fig. 4 is a transverse sectional view taken on the line 4—4 of Fig. 1.

Referring now to Fig. 1, there is shown a turbine wheel 10 which is secured to the end of a shaft 11 by suitable means. The shaft 11 is rotatably mounted in a housing 13 by means of a bearing 12 at one end adjacent the turbine wheel 10. The end of the turbine housing 13 is provided with and end wall 14 which carries a suitable sealing means 20 for providing a rotating seal on the backside of the turbine wheel 10. The end wall 14 is provided with a spaced radial flange 15 which is spaced from the main portion of the turbine housing and supported from the main portion of the turbine housing by means of a plurality of spaced webs 16. The turbine wheel is enclosed by means of a scroll housing 22 which is secured to the main housing by means of a plurality of studs 43 secured in a flange 42 formed on the scroll housing and passed through openings in the flange 15 of the main housing. Nuts 44 are threaded on the projecting ends of the studs 43 to secure the main housing to the scroll housing.

The housing is provided with a central bore or outlet opening 23 which is aligned with the outlet end 24 of the turbine wheel 10. The housing is also provided with a vortex generating chamber 21 which generally surrounds the outer periphery of the turbine wheel 10. The vortex chamber 21 is provided with an inner axial wall 26 and an outer axial wall 25 which is radially spaced from the inner wall. The right-hand end of the vortex chamber is closed by means of the wall 30, while the left-hand end is closed by a separate and removable end wall 40 which will be described below.

In the preferred embodiment, the vortex generating chamber 21 has a substantially constant radial dimension, while its axial dimension varies uniformly from a maximum adjacent the inlet of the turbine to substantially zero. This results in a cross-sectional area which varies linearly from a maximum at the inlet to a minimum substantially 360° later with respect to the circumferential position around the turbine wheel. This relationship between the cross-sectional area of the vortex generating chamber 21 and circumferential location of the cross-section about the turbine wheel is illustrated in Fig. 3 by the straight line "C."

It should also be noted that the center of the vortex chamber is located at a greater radial distance from the axis of the turbine wheel than the tip of the turbine wheel. Thus, because of the law of constant moment of momentum, the gas velocity and also the Mach number in the region where the vortex is created will be much smaller than at the tip of the wheel. This means that in the case of a turbine where the gas expands from the scroll housing inlet to the wheel inlet, the specific volume of the gas increases when going from the vortex generator inlet to the inlet of the turbine wheel.

In turbochargers used in industrial engines which are driven by exhaust gas, there exists a very low pressure ratio across the turbine wheel at low speeds, with practically no increase in the specific volume of gas from the vortex generator to the inlet of the turbine wheel, which results in a very small angle between the gas flow and the circumferential direction of the turbine wheel. As the speed of the engine increases and thus the pressure ratio across the turbine, the specific volume of the gas will increase between the vortex generator and the turbine inlet. This will result in an increase in the flow angle between the vortex flow path or streamline and the circumferential direction of the turbine wheel.

Thus, in effect, the vortex generator chamber whose center is placed a greater distance from the axis of the turbine wheel than the tip of the turbine wheel acts like a variable area nozzle to change the flow angle between the vortex gas and the circumferential direction of the turbine wheel as the quantity of fluid flow through the turbine increases.

The scroll housing 22 is provided with an enlarged section 31 at the turbine end of the inner wall 26 which provides a smooth fluid flow path through the turbine. The enlarged section has a curved inner wall 32 which has the same contour as the contour of the edge of the blades 34 thus establishing the flow path and the turbine inlet 35.

The end wall 40 is formed of thin sheet metal and has a generally ring shape with the outer edge 41 of the end wall being clamped between the opposing surfaces of the scroll housing 22 and the flange 15 of the main turbine housing. The flat radial surface or section 45 of the end wall has a slight conical shape as shown in Fig. 1, in order to provide a smooth flow path for the gases to the turbine inlet 35. Adjacent the periphery of the turbine wheel, the end wall is provided with a short axial section 46 which joins with another radial section 50. The radial section 50 is joined to a short conical section which terminates with an inner edge 51. The inner edge 51 engages one of the V-shaped grooves 52 formed in a portion of the end wall 14 of the turbine housing. The resiliency of the end wall 40 in co-operation with the short axial section 46 and the short radial section 50 allows the end wall to be sprung over the V-shaped grooves 52 and retained in place by the resiliency of the material used in forming the end wall.

The end wall shown in Fig. 1 would give a relationship between the cross-sectional area of the scroll and the circumferential position around the turbine wheel similar to the straight line curve "C" shown in Fig. 3.

Referring now to Fig. 2, there is shown the same turbine and housing structure illustrated in Fig. 1 but with a different end wall member 60. The end wall member 60 is formed so as to reduce the cross-sectional area of the scroll chamber 21 and thus the flow capacity of the turbine. This end wall would give a relationship between the cross-sectional area of the scroll chamber and the circumferential position around the turbine wheel similar to the straight line curve "D" shown in Fig. 3. The end wall 60 is provided with a short radial flange 61 which is clamped between the scroll housing 22 and the flange 15. The radial flange 61 joins with a short axial section 62 which projects to the right and joins with a conical-shaped radial wall 63. It will be noted that the short axial section 62 moves the radial wall 63 to the right to effect a reduction in the cross-sectional area of the scroll housing vortex generating chamber 21. The radial section 63 joins with a second axial section 64 at its inner edge which terminates with an inner circular edge 65. The inner edge 65 is retained in the V-shaped notches 52 in the same manner as described above with Fig. 1.

This invention thus provides a very low cost means for forming turbine housings having scroll housings of variable cross-sectional areas. All that is necessary to reduce the cross-sectional area is to provide a new end wall member which is easily fabricated from sheet metal. This invention eliminates the need for completely different scroll housings 22 as is required in previous vaneless type nozzle constructions. This invention also provides a means for varying the flow angle between the gas admitted to the turbine from the scroll chamber 21 between a full-load and a no-load condition. Thus, in effect, giving the equivalent of a variable area nozzle mechanism without the complications of a variable area nozzle mechanism.

Accordingly, while but one specific embodiment of this invention has ben described, it is susceptible to many modifications and improvements within its broad spirit and scope by those skilled in the art and, thus, it should not be limited to the specific example described.

What is claimed is:

1. A housing for a turbine wheel comprising a main housing member surrounding the turbine wheel and providing the inner and outer walls and one end wall of a circumferential inlet chamber of which the cross-sectional area decreases around the circumference in the direction of turbine wheel rotation substantially from the inlet to said chamber around the entire circumference to a minimum cross-sectional area, the inner wall of the inlet chamber having in it a substantially unobstructed annular port surrounding and immediately adjacent the outer periphery of the turbine wheel for admission of working fluid at automatically varying angles to the outer periphery of the turbine wheel, and a removable ring forming the other end wall of the chamber so as to be capable of being replaced by a ring of different shape to vary the volume of the chamber and the circumferential velocity for a given volumetric flow of fluid.

2. A housing for a turbine wheel comprising a main housing member surrounding the turbine wheel and providing the inner and outer walls and one end wall of a circumferential inlet chamber of which the cross-sectional area decreases around the circumference in the direction of turbine wheel rotation substantially from the inlet to said chamber around the entire circumference to a minimum cross-sectional area, the inner wall of the inlet chamber having in it a substantially unobstructed annular port surrounding and immediately adjacent the outer periphery of the turbine wheel for admission of working fluid at automatically varying angles to the outer periphery of the turbine wheel, a removable ring forming the other end wall of the chamber so as to be capable of being replaced by a ring of different shape to vary the volume of the chamber and the circumferential velocity for a given volumetric flow of fluid, and means engageable with the inner and outer portions of the ring to rigidly support it in chamber completing position.

3. A housing for a turbine wheel comprising a main housing member surrounding the turbine wheel and providing the inner and outer walls and one end wall of a circumferential inlet chamber of which the cross-sectional area decreases around the circumference in the direction of turbine wheel rotation substantially from the inlet to said chamber around the entire circumference to a minimum cross-sectional area, the inner wall of the inlet chamber having in it a substantially unobstructed annular port surrounding and immediately adjacent the outer periphery of the turbine wheel for admission of working fluid at automatically varying angles to the outer periphery of the turbine wheel, a removable ring forming the other end wall of the chamber so as to be capable of being replaced by a ring of different shape to vary the volume of the chamber and the circumferential velocity for a given volumetric flow of fluid, and means engageable with the inner and outer portions of the ring to rigidly support it in chamber-completing position, the inner ring support being constituted by a circumferential groove in a fixed part springingly engaged by the inner edge of the ring.

References Cited in the file of this patent

UNITED STATES PATENTS 2,801,043     Spotz _____ July 30, 1957